US012668712B2

(12) United States Patent (10) Patent No.: US 12,668,712 B2
Oguchi et al. (45) Date of Patent: Jun. 30, 2026

(54) TREATMENT LIQUID COMPOSITION FOR DYE PRINTING, COMPOSITION SET, TEXTILE PRINTING METHOD, AND INK JET TEXTILE PRINTING METHOD

(71) Applicant: SEIKO EPSON CORPORATION, Tokyo (JP)

(72) Inventors: Toshiaki Oguchi, Shiojiri (JP); Takayoshi Kagata, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 227 days.

(21) Appl. No.: 18/457,662

(22) Filed: Aug. 29, 2023

(65) Prior Publication Data

US 2024/0067840 A1      Feb. 29, 2024

(30) Foreign Application Priority Data

Aug. 31, 2022      (JP) ................................. 2022-137578

(51) Int. Cl.
C09D 11/54 (2014.01)
B41J 2/01 (2006.01)
(Continued)

(52) U.S. Cl.
CPC ................ C09D 11/54 (2013.01); B41J 2/01 (2013.01); B41J 2/2107 (2013.01); B41J 2/2114 (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS

| | | | | |
|---|---|---|---|---|
| 2010/0179249 A1* | 7/2010 | Schomaker | .......... | C09D 143/04 |
| | | | | 523/205 |
| 2014/0092168 A1* | 4/2014 | Ito | ........................ | C09D 11/54 |
| | | | | 106/31.86 |

(Continued)

FOREIGN PATENT DOCUMENTS

| | | | |
|---|---|---|---|
| GB | 1511810 A | 5/1978 |
| GB | 1531990 A | 11/1978 |

(Continued)

OTHER PUBLICATIONS

Glycerin MSDS (AllChem Industries; CAS# 56-81-5; 2006; pp. 1-6) (Year: 2006).*

(Continued)

*Primary Examiner* — Manish S Shah
(74) *Attorney, Agent, or Firm* — Harness, Dickey & Pierce, P.L.C.

(57) ABSTRACT

A treatment liquid composition for dye printing according to the present disclosure is used in a state of being attached to a fabric and includes resin particles, a crosslinking agent, an organic solvent, and water, in which the organic solvent has an SP value of 13.5 or less, the organic solvent has a standard boiling point of 100° C. or higher, and the content of the organic solvent is 5% by mass or more with respect to the total amount of the treatment liquid composition.

14 Claims, 1 Drawing Sheet

(51) Int. Cl.

| | |
|---|---|
| *B41J 2/21* | (2006.01) |
| *B41M 5/00* | (2006.01) |
| *C09D 11/033* | (2014.01) |
| *C09D 11/037* | (2014.01) |
| *C09D 11/328* | (2014.01) |
| *C09D 11/38* | (2014.01) |
| *C09D 11/40* | (2014.01) |
| *D06P 1/642* | (2006.01) |
| *D06P 5/22* | (2006.01) |
| *D06P 5/30* | (2006.01) |

(52) U.S. Cl.

CPC .......... *C09D 11/033* (2013.01); *C09D 11/037* (2013.01); *C09D 11/328* (2013.01); *C09D 11/38* (2013.01); *C09D 11/40* (2013.01); *D06P 1/6426* (2013.01); *D06P 5/22* (2013.01); *D06P 5/30* (2013.01); *B41M 5/0017* (2013.01); *B41M 5/0064* (2013.01)

(58) Field of Classification Search

CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 2/18; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS

| | | | | |
|---|---|---|---|---|
| 2016/0230334 A1* | 8/2016 | Oki | .................. | C09D 11/38 |
| 2017/0260690 A1* | 9/2017 | Sloan | .................. | D06P 1/54 |
| 2019/0003115 A1* | 1/2019 | Ohashi | ............... | B41J 11/0015 |
| 2019/0301086 A1* | 10/2019 | Naruse | ............... | B41J 11/0015 |
| 2022/0097435 A1* | 3/2022 | Oki | ............... | B41J 2/145 |
| 2023/0082351 A1* | 3/2023 | Shimura | ............... | C09D 11/38 |
| | | | | 8/471 |

FOREIGN PATENT DOCUMENTS

| | | | |
|---|---|---|---|
| JP | S52-070183 | A | 6/1977 |
| JP | S52-118077 | A | 10/1977 |
| JP | 2006-124843 | A | 5/2006 |
| JP | 2009-249773 | A | 10/2009 |

OTHER PUBLICATIONS

Triethylene Glycol MSDS (Thermo Fisher Scientific; CAS# 112-27-6; 2021; pp. 1-7) (Year: 2021).*

* cited by examiner

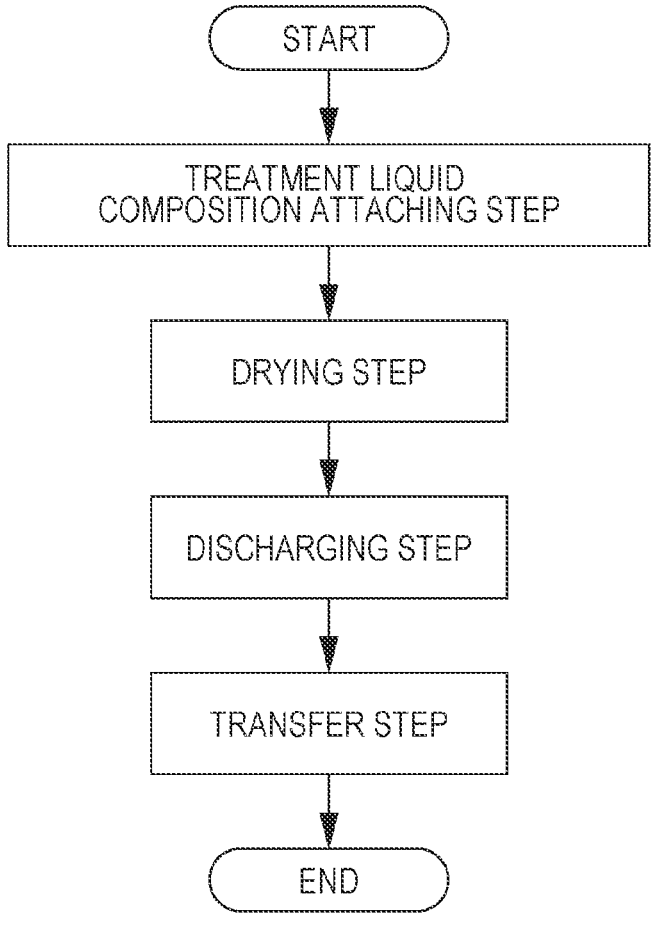

TREATMENT LIQUID COMPOSITION FOR DYE PRINTING, COMPOSITION SET, TEXTILE PRINTING METHOD, AND INK JET TEXTILE PRINTING METHOD

The present application is based on, and claims priority from JP Application Serial Number 2022-137578, filed Aug. 31, 2022, the disclosure of which is hereby incorporated by reference herein in its entirety.

BACKGROUND

1. Technical Field

The present disclosure relates to a treatment liquid composition for dye printing, a composition set, a textile printing method, and an ink jet textile printing method.

2. Related Art

A technology in which, when a fabric is dyed with a coloring material to produce a printed textile, the fabric is subjected to a pretreatment by using a treatment liquid in order to improve the color development properties, dry cleaning resistance, and the like of the coloring material, has been hitherto known. Regarding such a technology, for example, in JP-A-52-70183, there is known a technology of impregnating a sheet-shaped structure with an aqueous liquid including an organic solvent for a disperse dye, the organic solvent being miscible with water boiling at 140° C. or higher, a crosslinking agent, and a high polymer that can be dyed with a disperse dye and can be fixed to a fiber material, drying the sheet-shaped structure, and performing heat transfer textile printing.

However, since the aqueous liquid of JP-A-52-70183 has high permeability into a fabric, the treatment liquid is not likely to stay in the vicinity of the fabric, and therefore, when the aqueous liquid of JP-A-52-70183 is used, there is a problem that an effect of modification of the fabric by the treatment liquid is not obtained, while it is difficult to obtain a textile printed material having excellent color development properties and dry cleaning resistance.

SUMMARY

According to an aspect of the present disclosure, there is provided a treatment liquid composition for dye printing used in a state of being attached to a fabric, the treatment liquid composition including resin particles, a crosslinking agent, an organic solvent, and water, in which the organic solvent has an SP value of 13.5 or less, the organic solvent has a standard boiling point of 100° C. or higher, and a content of the organic solvent is 5% by mass or more with respect to a total amount of the treatment liquid composition.

BRIEF DESCRIPTION OF THE DRAWING

FIGURE is a flowchart illustrating an example of an indirect textile printing recording method of the present embodiment.

DESCRIPTION OF EMBODIMENTS

Hereinafter, an embodiment of the present disclosure (hereinafter, referred to as "the present embodiment") will be described in detail; however, the present disclosure is not limited thereto, and various modifications can be made to the extent that the gist thereof is maintained.

1. Treatment Liquid Composition for Dye Printing

The treatment liquid composition for dye printing of the present embodiment (hereinafter, also referred to as "treatment liquid composition") is a treatment liquid composition that is used in a state of being attached to a fabric, the treatment liquid composition includes resin particles, a crosslinking agent, an organic solvent, and water, the organic solvent has an SP value of 13.5 or less, the organic solvent has a standard boiling point of 100° C. or higher, and the content of the organic solvent is 5% by mass or more with respect to the total amount of the treatment liquid composition. It is preferable that the treatment liquid composition is used for attaching to a fabric before the fabric is subjected to dye printing.

According to the present embodiment, a printed textile having excellent color development properties and dry cleaning resistance can be obtained by attaching the treatment liquid composition to a fabric in advance, and subjecting the fabric having the treatment liquid composition attached thereto to dye printing.

The reason why excellent effects are obtained by the present embodiment in this way is not clearly understood; however, the inventors of the present disclosure presume the reason as follows.

That is, since a fabric is usually highly permeable to the treatment liquid composition, the treatment liquid is less likely to stay in the vicinity of the fabric. Accordingly, it is difficult to obtain the effect provided by the treatment liquid, that is, modification of the fabric by the treatment liquid, and therefore, the obtained textile printed material tends to have inferior color development properties and dry cleaning resistance.

However, the treatment liquid composition of the present embodiment includes resin particles, a crosslinking agent, an organic solvent, and water, the SP value of the organic solvent is 13.5 or less, the standard boiling point of the organic solvent is 100° C. or higher, and the content of the organic solvent is 5% by mass or more with respect to the total amount of the treatment liquid composition. When the treatment liquid composition includes a specific amount of a specific organic solvent, the permeability of the fabric to the treatment liquid is lowered, and the treatment liquid is likely to stay in the vicinity of the fabric. Furthermore, since the organic solvent according to the present embodiment has a high boiling point, the organic solvent does not easily volatilize even during heating at the time of drying after attaching the treatment liquid composition to the fabric or at the time of transferring an image, and the organic solvent can stay in the vicinity of the fabric. In addition, since the SP value of the organic solvent is in a specific range, the compatibility with an oil-soluble dye included in the ink composition is relatively high. Therefore, the dye can be suitably dissolved in the organic solvent remaining in the vicinity of the fabric and can develop a color. In addition, since the treatment liquid composition includes resin particles and a crosslinking agent, the dye dissolved in the organic solvent also dyes the resin particles, and the dyed resin particles are suitably bound to the fabric by the crosslinking agent. For such a reason, a large amount of ink can be attached to the vicinity of a fabric by attaching the treatment liquid composition of the present embodiment to the fabric and performing dye printing. Therefore, it is presumed that a printed textile having excellent color development properties and dry cleaning resistance can be obtained. However, the reason is not limited to this.

Next, each of the components included in the treatment liquid composition and the ink composition will be described.

1.1. Resin

The treatment liquid composition includes resin particles.

When the treatment liquid composition includes resin particles, a printed textile having excellent color development properties and dry cleaning resistance can be obtained.

Examples of the resin particles include particles of a polyester-based resin, a urethane-based resin, an addition polymerization-based resin, a fluorine resin, and a naturally occurring resin. These resin particles are often handled in an emulsion form, that is, as a resin dispersion; however, the resin particles may be supplied in a powder state. Furthermore, regarding the resin particles, one kind thereof can be used alone, or two or more kinds thereof can be used in combination.

From the viewpoint of obtaining a printed textile having more excellent color development properties and dry cleaning resistance while having laundering fastness and texture characteristics in the balanced manner, it is preferable that the resin particles include one or more selected from the group consisting of a polyester-based resin and a urethane-based resin, and it is more preferable that the resin particles include a polyester-based resin.

Examples of the polyester-based resin include a resin having a constituent unit derived from a polyvalent carboxylic acid and a constituent unit derived from a polyhydric alcohol.

Examples of the polyvalent carboxylic acid include terephthalic acid, isophthalic acid, orthophthalic acid, phthalic acid, 4,4'-diphenyldicarboxylic acid, 2,5-naphthalenedicarboxylic acid, 1,5-naphthalenedicarboxylic acid, and 2,6-naphthalenedicarboxylic acid, 2,7-naphthalenedicarboxylic acid, 1,4-cyclohexanedicarboxylic acid, 2-potassium sulfoterephthalic acid, 5-sodium sulfoisophthalic acid, adipic acid, azelaic acid, sebacic acid, dodecanedicarboxylic acid, glutaric acid, succinic acid, trimellitic acid, trimesic acid, pyromellitic acid, trimellitic anhydride, phthalic anhydride, succinic anhydride, and p-hydroxybenzoic acid, as well as salts thereof. Examples of the salt include potassium salt, sodium salt, calcium salt, and magnesium salt.

Examples of the polyhydric alcohol include ethylene glycol, 1,2-propylene glycol, 1,3-propylene glycol, 1,3-propanediol, 1,3-butylene glycol, 1,4-butanediol, 1,6-hexanediol, 2-methyl-1,5-pentanediol, neopentyl glycol, 1,4-cyclohexanedimethanol, p-xylylene glycol, bisphenol A-ethylene glycol adduct, diethylene glycol, triethylene glycol, polyethylene glycol, polypropylene glycol, polytetramethylene glycol, polytetramethylene oxide glycol, dimethylolpropionic acid, glycerin, trimethylolpropane, sodium dimethylolethylsulfonate, potassium dimethylolethylsulfonate, and potassium dimethylolpropionate.

It is preferable that the polyester-based resin includes a hydroxyl group, a carboxy group, a sulfonic acid group, and sodium salts thereof. One kind or two or more kinds of these groups may be included in the polyester-based resin.

The sulfonic acid group-containing polyester-based resin has, for example, a constituent unit derived from a polyvalent carboxylic acid, a constituent unit derived from a polyhydric alcohol, and a constituent unit derived from a sulfonic acid group-containing aromatic monomer.

Examples of the sulfonic acid group-containing aromatic monomer include 5-sulfoisophthalic acid, sulfoterephthalic acid, 4-sulfophthalic acid, 4-sulfonaphthalene-2,7-dicarboxylic acid, and 4-sulfo-1,8-naphthalenedicarboxylic acid anhydride, as well as salts thereof. As the salt, reference may be made to the above-described ones, and a sodium salt is preferred.

When the polyester-based resin includes those groups, the polyester-based resin can react satisfactorily with a cross-linking agent and preferably an isocyanate group-containing compound, and satisfactory bindability to a fabric, preferably a fabric including fibers having a hydroxyl group, is obtained. Therefore, it is possible to obtain a printed textile having more excellent color development properties and dry cleaning resistance while having laundering fastness and texture characteristics in a more well-balanced manner.

The polyester-based resin is obtained by, for example, appropriately selecting one or more from each of the above-described polyvalent carboxylic acids, polyhydric alcohols, and sulfonic acid group-containing aromatic monomers as necessary, and performing synthesis by a conventional polycondensation reaction.

Regarding such a polyester-based resin, a commercially available product can also be used. Examples of the commercially available product include ELITEL (registered trademark) KA-5071S, KT-8803, KT-9204, KT-8701, KT-8904, and KT-0507 (all trade names, Unitika, Ltd., polyester resin emulsion); HITECH (registered trademark) SN-2002 (trade name, Toho Chemical Industry Co., Ltd., polyester resin emulsion); PLUSCOAT (registered trademark) Z-221, Z-446, Z-561, Z-565, RZ-570, Z-592, Z-687, Z-690, Z-730, Z-760, RZ-105, RZ-570, and RZ-760 (all trade names, manufactured by Goo Chemical Co., Ltd.); and VYLONAL (registered trademark) MD-1200, MD-1500, and MD-2000 (all trade names, manufactured by Toyobo Co., Ltd.).

The urethane-based resin is a general term for resins having a urethane bond. Examples of the urethane-based resin include a polyether-type urethane resin including an ether bond in the main chain in addition to a urethane bond, a polyester-type urethane resin including an ester bond in the main chain, and a polycarbonate-type urethane resin including a carbonate bond in the main chain. As the urethane-based resin, a commercially available product may be used, and examples thereof include SUPERFLEX (registered trademark) 460, 460s, 840, E-4000 (manufactured by Daiichi Kogyo Seiyaku Co., Ltd.); RESAMINE (registered trademark) D-1060, D-2020, D-4080, D-4200, D-6300, D-6455 (manufactured by Dainichiseika Color & Chemicals Manufacturing Co., Ltd.); TAKELAC (registered trademark) W-6061, WS-6021, W-512-A-6 (manufactured by Mitsui Chemicals, Inc.); SANCURE (registered trademark) 2710 (manufactured by LUBRIZOL Corporation); and PERMARIN (registered trademark) UA-150 (manufactured by Sanyo Chemical Industries, Ltd.).

Examples of the addition polymerization-based resin include homopolymers or copolymers of (meth)acrylic acid, (meth)acrylic acid ester, acrylonitrile, cyanoacrylate, acrylamide, olefin, styrene, silicone, rosin, terpene, epoxy, polyester, vinyl acetate, vinyl chloride, vinyl alcohol, vinyl ether, vinylpyrrolidone, vinylpyridine, vinylcarbazole, vinylimidazole, and vinylidene chloride.

Examples of other commercially available products in the form of emulsion include VINYBLAN (registered trademark) 150, 603, 745, 1245L (manufactured by Nissin Chemical Industry Co., Ltd.); DANFIX (registered trademark) MM11 (manufactured by Nissin Chemical Industry Co., Ltd.); SENKA ANTIFRIC (registered trademark) CX-2 (manufactured by Senka Co., Ltd.); MOVINYL (registered trademark) 966A (manufactured by Nippon Synthetic Chemical Industry Co., Ltd.); MICROGEL (registered trademark) E-1002, E-5002 (manufactured by Nippon Paint Co., Ltd.); BONCOAT (registered trademark) 4001, 5454 (manufactured by DIC Corporation); SAE1014 (manufactured by Zeon Corporation); SAIVINOL (registered trademark) SK-200 (manufactured by Saiden Chemical Industry Co., Ltd.); JONCRYL (registered trademark) 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, 7610 (manufactured by BASF SE); NK BINDER R-5HN (manufactured by Shin-Nakamura Chemical Co., Ltd.); SANCURE 2710 (Lubrizol Japan, Ltd.); PERMARIN (registered trademark) UA-150 (manufactured by Sanyo Chemical Industries, Ltd.); SUPERFLEX (registered trademark) 460, 470, 610, 700 (manufactured by Daiichi Kogyo Seiyaku Co., Ltd.); NEOREZ (registered trademark) R-9660, R-9637, R-940 (manufactured by Kusumoto Chemicals, Ltd.); ADEKA BONTIGHTER (registered trademark) HUX-380, 290K (manufactured by ADEKA Corporation); and TAKELAC (registered trademark) W-605, W-635, and WS-6021 (manufactured by Mitsui Chemicals, Inc.).

Commercially available products have been listed above; however, the resin particles may be obtained by synthesis by conventional methods.

From the viewpoint of obtaining a printed textile having more excellent color development properties and dry cleaning resistance and also having laundering fastness and texture characteristics in a more well-balanced manner, the content of the resin particles is preferably 1% by mass or more and 20% by mass or less in terms of solid content, with respect to the total amount of the treatment liquid composition. From the viewpoint of obtaining a printed textile having even more excellent color development properties and dry cleaning resistance and also having laundering fastness and texture characteristics in a more well-balanced manner, the content of the resin particles is more preferably 2% by mass or more and 15% by mass or less, and even more preferably 2% by mass or more and 10% by mass or less, in terms of solid content, with respect to the total amount of the treatment liquid composition.

1. 2. Crosslinking Agent

The treatment liquid composition includes a crosslinking agent.

When the treatment liquid composition includes a crosslinking agent, crosslinking properties can be imparted to the treatment liquid composition, and it is possible to bind the resin particles, the dye, and the fabric together. Therefore, a textile printed material having excellent color development properties and dry cleaning resistance is obtained.

The crosslinking agent can be appropriately selected from known crosslinking agents and used, and the crosslinking agent may initiate a crosslinking reaction at normal temperature or may initiate a crosslinking reaction by heat. Examples of such a crosslinking agent include a crosslinking agent having self-crosslinking properties, a compound having in the molecule a plurality of functional groups that react with an unsaturated carboxylic acid component, and a metal having a polyvalent coordination position.

From the viewpoint that a textile printed material having more excellent color development properties and dry cleaning resistance while having laundering fastness and texture characteristics in a more well-balanced manner tends to be obtained, it is preferable that the crosslinking agent includes one or more selected from the group consisting of an isocyanate group-containing compound and an oxazoline group-containing compound, and it is more preferable that the crosslinking agent includes an isocyanate group-containing compound.

Examples of the isocyanate group-containing compound include a water dispersion type (blocked) polyisocyanate. The (blocked) polyisocyanate means a polyisocyanate and/or a blocked polyisocyanate. These isocyanate group-containing compounds may be used singly or in combination of two or more kinds thereof.

Examples of the water dispersion type polyisocyanate include products obtained by dispersing a polyisocyanate that has been imparted with hydrophilicity by a polyethylene oxide chain, in water with an anionic dispersant or a nonionic dispersant.

Examples of the polyisocyanate include diisocyanates such as hexamethylene diisocyanate and isophorone diisocyanate; and derivatives (modification products) of polyisocyanate such as a trimethylolpropane adduct form, a biuret form, and an isocyanurate form of these diisocyanates. Furthermore, the polyisocyanate may have an isocyanurate skeleton in its structure. These polyisocyanates may be used singly or in combination of two or more kinds thereof.

The water dispersion type blocked polyisocyanate is obtained by blocking the isocyanate groups of the water dispersion type polyisocyanate with a blocking agent. Examples of the blocking agent include diethyl malonate, ethyl acetoacetate, $\varepsilon$-caprolactam, butanone oxime, cyclohexanone oxime, 1,2,4-triazole, dimethyl-1,2,4-triazole, 3,5-dimethylpyrazole, and imidazole. These blocking agents may be used singly, or two or more kinds thereof may be used in combination.

The crosslinking agent is preferably an isocyanate group-containing compound having an isocyanurate skeleton in the structure, and more preferably a water dispersion type polyisocyanate having an isocyanurate skeleton in the structure. Since an isocyanate group-containing compound having an isocyanurate skeleton has at least three crosslinking points, there is a tendency that more suitable bindability between the resin particles and the fabric can be obtained. Therefore, a textile printed material having even more excellent color development properties and dry cleaning resistance while having laundering fastness and texture characteristics in a more well-balanced manner tends to be obtained.

Regarding such an isocyanate group-containing compound, a commercially available product can also be used. Examples of the commercially available product include FIXER #100ECO, #104EA, #220, 70ECO, #70, #410, and #400 (all trade names, Murayama Chemical Laboratory Co., Ltd.); and ELASTRON (registered trademark) BN-11, BN-27, BN-69, and BN-77 (all trade names, Daiichi Kogyo Seiyaku Co., Ltd.).

Examples of the oxazoline group-containing compound include a compound having two or more oxazoline groups in the molecule. Examples of such an oxazoline group-containing compound include 2,2'-bis(2-oxazoline), 2,2'-methylene-bis(2-oxazoline), 2,2'-ethylene-bis(2-oxazoline), 2,2'-trimethylene-bis(2-oxazoline), 2,2'-tetramethylene-bis(2-oxazoline), 2,2'-hexamethylene-bis(2-oxazoline), 2,2'-octamethylene-bis(2-oxazoline), 2,2'-ethylene-bis(4,4'-dimethyl-2-oxazoline), 2,2'-p-phenylene-bis(2-oxazoline), 2,2'-m-phenylene-bis(2-oxazoline), 2,2'-m-phenylene-bis(4,4'-dimethyl-2-oxazoline), bis(2-oxazolinylcyclohexane) sulfide, bis(2-oxazolinylnorbornane) sulfide and an oxazoline ring-containing polymer. These oxazoline group-containing compounds may be used singly or in combination of two or more kinds thereof.

From the viewpoint that a textile printed material having more excellent color development properties and dry cleaning resistance while having laundering fastness and texture characteristics in a well-balanced manner tends to be obtained, it is preferable that a water-soluble oxazoline group-containing compound is included as the oxazoline group-containing compound.

Regarding such an oxazoline group-containing compound, a commercially available product can also be used. Examples of the commercially available product include EPOCROS (registered trademark) K-2010, K-2020, K-2030, K-2035E, WS-300, WS-500, and WS-700 (all trade names, Nippon Shokubai Co., Ltd.).

Regarding the crosslinking agent, one kind thereof may be used alone, or two or more kinds thereof may be used in combination.

From the viewpoint that a textile printed material having even more excellent color development properties and dry cleaning resistance while having laundering fastness and texture characteristics in a more well-balanced manner tends to be obtained, the content of the crosslinking agent is preferably 0.1% by mass or more and 5% by mass or less, and more preferably 0.5% by mass or more and 3% by mass or less, in terms of solid content, with respect to the total amount of the treatment liquid composition.

1.3. Organic Solvent

The treatment liquid composition includes an organic solvent. The SP value of the organic solvent is 13.5 or less, and the standard boiling point of the organic solvent (hereinafter, also referred to as "b.p.") is 100° C. or higher (hereinafter, also referred to as "specific organic solvent"). Regarding the specific organic solvent, one kind thereof can be used alone, or two or more kinds thereof can be used in combination.

In the present specification, the SP value is a solubility parameter based on the Hansen method, and is also referred to as Hansen S P value. In the Hansen method, the SP value " is classified into three terms and calculated by being expressed such that $$\delta^2 = \delta_{d2} + \delta_{p2} + \delta_{h2}. \quad \delta_d, \delta_p, \text{ and } \delta_h$$

are solubility parameters corresponding to the dispersion force term, the inter-dipole force term, and the hydrogen bonding force term, respectively. The unit of the SP value and the Hansen S P value is $(cal/cm^3)^{1/2}$. As the Hansen S P value, a value derived by using calculation software Hansen-Solubility HSPiP may be used.

According to the present specification, the standard boiling point means the boiling point at a standard atmospheric pressure of 1013.25 hPa.

In the present embodiment, when a specific organic solvent is used, the water absorption behavior of a fabric can be mitigated, the permeability of the treatment liquid composition into the fabric can be lowered, and therefore, the treatment liquid is likely to stay in the vicinity of the fabric. Furthermore, since the specific organic solvent has an SP value of 13.5 or less, the compatibility with the dye included in the ink composition is relatively high. Therefore, the dye can be suitably dissolved in the organic solvent remaining in the vicinity of the fabric, and the resin particles in the vicinity of the fabric can be suitably dyed.

From the viewpoint that a textile printed material having more excellent color development properties and dry cleaning resistance while having laundering fastness and texture characteristics in a more well-balanced manner tends to be obtained, the lower limit of the SP value of the organic solvent is preferably 7.0 or more and more preferably 8.0 or more.

From the viewpoint that a textile printed material having more excellent color development properties and dry cleaning resistance while having laundering fastness and texture characteristics in a more well-balanced manner tends to be obtained, the upper limit of the standard boiling point of the organic solvent is preferably 300° C. or lower, and more preferably 289° C. or lower.

The specific organic solvent is not particularly limited as long as it has an SP value of 13.5 or less and a standard boiling point of 100° C. or higher. Examples of such a specific organic solvent include a glycol, a glycol ether, a nitrogen-containing solvent, an ester, a cyclic ester, and a monool, all of which have an SP value of 13.5 or less and a standard boiling point of 100° C. or higher. From the viewpoint that a textile printed material having more excellent color development properties and dry cleaning resistance while having laundering fastness and texture characteristics in a more well-balanced manner tends to be obtained, it is preferable that the specific organic solvent includes one or more selected from the group consisting of a glycol, a glycol ether, and a nitrogen-containing solvent, all of which have an SP value of 13.5 or less and a standard boiling point of 100° C. or higher.

Examples of a glycol having an SP value of 13.5 or less and a standard boiling point of 100° C. or higher include triethylene glycol (SP value: 13.5, standard boiling point: 287° C.), 1,2-hexanediol (SP value: 12.1, standard boiling point: 170° C.), diethylene glycol (SP value: 12.1, standard boiling point: 245° C.), dipropylene glycol (SP value: 12.1, standard boiling point: 231° C.), 1,3-butanediol (SP value: 11.6, standard boiling point: 207° C.), 1,6-hexanediol (SP value: 12.3, standard boiling point: 250° C.), tetraethylene glycol (SP value: 12.3, standard boiling point: 314° C.), and 2-ethyl-1,3-hexanediol (SP value: 11.3, standard boiling point: 244° C.)

Examples of a glycol ether having an SP value of 13.5 or less and a standard boiling point of 100° C. or higher include dipropylene glycol monomethyl ether (SP value: 10.1, standard boiling point of 188° C.), dipropylene glycol dimethyl ether. (SP value: 8.4, standard boiling point: 171° C.), triethylene glycol monobutyl ether (SP value: 10.0, standard boiling point: 278° C.), ethylene glycol diethyl ether (SP value: 8.3, standard boiling point: 189° C.), ethylene glycol monoethyl ether (SP value: 10.5, standard boiling point: 135° C.), ethylene glycol monophenyl ether (SP value: 11.5, standard boiling point: 245° C.), ethylene glycol monobutyl ether (SP value: 9.5, standard boiling point: 171° C.), ethylene glycol monobenzyl ether (SP value: 10.9, standard boiling point: 256° C.), ethylene glycol monomethyl ether (SP value: 11.4, standard boiling point: 124° C.), diethylene glycol monoethyl ether (SP value: 10.2, standard boiling point: 202° C.), diethylene glycol monobutyl ether (SP value: 10.0, standard boiling point: 231° C.), triethylene glycol monomethyl ether (SP value: 10.5. standard boiling point: 248° C.), and propylene glycol monomethyl ether (SP value: 10.0, standard boiling point: 121° C.)

Examples of a nitrogen-containing solvent having an SP value of 13.5 or less and a standard boiling point of 100° C. or higher include 2-pyrrolidone (SP value: 11.5, standard boiling point: 245° C.), dimethylformamide (SP value: 12.2, standard boiling point: 153° C.), N-methyl-2-pyrrolidone (SP value: 11.2, standard boiling point: 202° C.), and aniline (SP value: 11.6, standard boiling point: 184° C.)

Examples of an ester having an SP value of 13.5 or less and a standard boiling point of 100° C. or higher include ethylene glycol diacetate (SP value: 10.0, standard boiling point: 190° C.), ethylene glycol monomethyl ether acetate (SP value: 9.2, standard boiling point: 145° C.), diethylene glycol monobutyl ether acetate (SP value: 8.5, standard boiling point: 246° C.), allyl acetate (SP value: 9.2, standard boiling point: 103° C.), and butyl acetate (SP value: 8.5, standard boiling point: 126° C.)

Examples of a cyclic ester having an SP value of 13.5 or less and a standard boiling point of 100° C. or higher include ε-caprolactone (SP value: 10.1, standard boiling point: 241° C.)

Examples of a monool having an SP value of 13.5 or less and a standard boiling point of 100° C. or higher include 1-butanol (SP value: 11.3, standard boiling point: 118° C.), 2-ethyl-1-hexanol (SP value: 9.5, standard boiling point: 185° C.), and 3-buten-1-ol (SP value: 11.0, standard boiling point: 114° C.)

From the viewpoint that a textile printed material having more excellent color development properties and dry cleaning resistance while having laundering fastness and texture characteristics in a more well-balanced manner tends to be obtained, it is preferable that the organic solvent includes one or more selected from the group consisting of triethylene glycol, dipropylene glycol monomethyl ether, dipropylene glycol dimethyl ether, triethylene glycol monobutyl ether, and 2-pyrrolidone.

From the viewpoint that a textile printed material having even more excellent color development properties and dry cleaning resistance while having laundering fastness and texture characteristics in an even more well-balanced manner tends to be obtained, the content of the organic solvent is 5% by mass or more, preferably 5% by mass or more and 50% by mass or less, more preferably 10% by mass or more and 40% by mass or less, and even more preferably 15% by mass or more and 30% by mass or less, with respect to the total amount of the treatment liquid composition.

1.4. Water

The treatment liquid composition includes water.

Water is evaporated and scattered by drying, after attaching the treatment liquid composition to the fabric. Examples of water include pure water such as ion-exchanged water, ultrafiltration water, reverse osmosis water, and distilled water; and ultrapure water, from which ionic impurities have been removed as much as possible. Furthermore, water sterilized by irradiation with ultraviolet radiation, addition of hydrogen peroxide, or the like is preferred because growth of fungi and bacteria can be suppressed when the treatment liquid composition is stored for a long period of time.

The content of water is 30% by mass or more and 98% by mass or less, preferably 35% by mass or more and 96% by mass or less, and more preferably 40% by mass or more and 94% by mass or less, with respect to the total amount of the treatment liquid composition. By setting the content of water in the above-described range, an increase in the viscosity of the treatment liquid can be suppressed, and workability at the time of attaching the treatment liquid to a fabric, and dryability after attaching can be improved.

From the viewpoint that higher affinity and higher safety are obtained for a fabric, preferably a fabric including fibers having a hydroxyl group, it is preferable that the treatment liquid composition is a water-based treatment liquid composition. In the present embodiment, the term "water-based" means that the content of water with respect to the total amount of the composition is 30% by mass or more.

1.5. Other Organic Solvent

The treatment liquid composition may include another organic solvent other than the specific organic solvent, as long as the effects of the present disclosure are achieved. The other organic solvent is not particularly limited as long as the SP value is more than 13.5 and the standard boiling point is lower than 100° C. It is preferable that the other organic solvent is water-soluble.

Examples of such a water-soluble organic solvent include glycerin; a glycol such as ethylene glycol; a glycol monoether such as ethylene glycol monomethyl ether; and an alcohol such as methanol or ethanol.

Regarding the other organic solvent, one kind thereof may be used alone, or two or more kinds thereof may be used in combination.

The content of the other organic solvent is usually 20% by mass or less and may be 0.01% by mass or more and 15% by mass or less, with respect to the total amount of the treatment liquid composition.

1.6. Other Components

The treatment liquid composition may include various additives such as a surfactant, a dissolution aid, a viscosity modifier, a pH adjusting agent, an antioxidant, an antiseptic, an antifungal agent, a corrosion inhibitor, and a chelating agent.

Regarding the additives, one kind thereof may be used alone, or two or more kinds thereof may be used in combination.

The content of each additive is, for example, 0.01% by mass or more and 5.0% by mass or less with respect to the total amount of the treatment liquid composition.

1.7. Method for Preparing Treatment Liquid Composition

The treatment liquid composition can be prepared by mixing each of the components in any order and performing filtration or the like as necessary to remove impurities, foreign substances, and the like. As a method of mixing each of the components, a method of sequentially introducing each component into a container equipped with a stirring device such as a mechanical stirrer or a magnetic stirrer, and performing stirring and mixing, is used. Examples of a filtration method include centrifugal filtration and filter filtration.

1.8. Physical Properties of Treatment Liquid Composition

The physical properties of the treatment liquid composition are optionally regulated according to the type of fabric, the method of attaching to the fabric, that is, the coating method, and the like. A method for applying the treatment liquid composition will be described later.

1.8.1. Viscosity

The viscosity at 20° C. of the treatment liquid composition is preferably 1.5 mPa·s or more and 100 mPa·s or less. By setting the viscosity of the treatment liquid in the above-described range, the coatability such as the ease of spreading of the treatment liquid when the treatment liquid is attached to the fabric, can be improved.

The viscosity of the treatment liquid composition can be measured by using, for example, a viscoelasticity tester MCR-300 (Physica Messtechnik GmbH). Specifically, the viscosity can be measured by adjusting the temperature of the treatment liquid composition to 20° C. and reading the shear viscosity (mPa·s) at a shear rate of 200 (1/s).

1.8.2. Surface Tension

The surface tension at 25° C. of the treatment liquid composition is preferably 30 mN/m or more and 50 mN/m or less. By setting the surface tension at 25° C. of the treatment liquid composition in the above-described range, appropriate wettability and permeability to the fabric are exhibited. Furthermore, since the treatment liquid composition is easily absorbed uniformly by the fabric, a density difference in the amount of attachment occurring when applying the treatment liquid composition, that is, the occurrence of coating unevenness, can be suppressed.

The surface tension of the treatment liquid composition can be measured by using, for example, an automatic surface tension meter CBVP-Z (Kyowa Interface Science Co., Ltd.). Specifically, measurement can be made by reading the surface tension when a platinum plate is wetted with the treatment liquid composition in an environment at 25° C.

2. Ink Jet Ink Composition

An ink jet ink composition (hereinafter, also referred to as "ink composition") is used for perform textile printing on a fabric to which the treatment liquid composition of the present embodiment is attached, to produce a printed textile. Next, the ink composition will be described.

The ink composition according to the present embodiment includes a disperse dye and water.

2.1. Disperse Dye

From the viewpoint of obtaining excellent color development properties for a fabric having the treatment liquid composition attached thereto, the ink composition includes a disperse dye as a dye. The disperse dye is a coloring material that usually forms a particle form and is dispersed in a dispersion medium by a dispersant. Furthermore, the disperse dye is usually a nonionic dye having a hydrophilic group and an appropriate polar group. Regarding the disperse dye, one kind thereof may be used alone, or two or more kinds thereof may be used in combination.

Examples of the disperse dye include C. I. Disperse Yellow, C. I. Disperse Red, C. I. Disperse Blue, C. I. Disperse Orange, C. I. Disperse Violet, C. I. Disperse Green, C. I. Disperse Brown, and C. I. Disperse Black.

Among those, a sublimation dye is preferred as a dispersant. Here, the "sublimation dye" refers to a dye having a property of sublimating by heating.

Specific examples of such a sublimation dye include C. I. Disperse Yellow 3, 7, 8, 23, 39, 51, 54, 60, 71, and 86; C. I. Disperse Orange 1, 1:1, 5, 20, 25, 25:1, 33, 56, and 76; C. I. Disperse Brown 2; C. I. Disperse Red 11, 50, 53, 55, 55:1, 59, 60, 65, 70, 75, 93, 146, 158, 190, 190:1, 207, 239, and 240; C. I. Vat Red 41; C. I. Disperse Violet 8, 17, 23, 27, 28, 29, 36, and 57; C. I. Disperse Blue 14, 19, 26, 26:1, 35, 55, 56, 58, 64, 64:1, 72, 72:1, 81, 81:1, 91, 95, 108, 131, 141, 145, and 359; and C. I. Solvent Blue 36, 63, 105, and 111.

In the present embodiment, from the viewpoint of obtaining more satisfactory dyeability for a fabric having the treatment liquid composition attached thereto, and obtaining a printed textile having sufficient color development properties, a cyan dye, a red dye, and a yellow dye are preferred. From the viewpoint of obtaining even more satisfactory dyeability and obtaining a printed textile having sufficient color development properties, as the cyan dye, C. I. Disperse Blue 359 is more preferred. As the red dye, C. I. Disperse Red 60 is more preferred. As the yellow dye, C. I. Disperse Yellow 54 is more preferred.

From the viewpoint of more effectively and reliably achieving the operating effects of the present embodiment, the content of the coloring material is preferably 0.05% by mass or more and 20% by mass or less with respect to the total amount of the ink composition.

2.2. Water

The ink composition includes water.

As the water, reference can be made to the above-described water included in the treatment liquid composition, including preferred embodiments.

From the viewpoint of more effectively and reliably achieving the operating effects of the present embodiment, the content of water is preferably 30% by mass or more and 80% by mass or less with respect to the total amount of the ink composition.

2.3. Dispersant

The ink composition may include a dispersant.

When the ink composition includes a dispersant, excellent dispersibility of the disperse dye is obtained, and excellent clogging resistance of the ink composition is obtained. Examples of the dispersant include sodium naphthalene sulfonate-formalin condensate and a resin. Sodium naphthalene sulfonate-formalin condensate is a compound obtained by subjecting a sulfonate having a naphthalene ring in the molecule to formalin-condensation, or a salt thereof. Regarding the dispersant, one kind thereof may be used alone, or two or more kinds thereof may be used in combination.

From the viewpoint of having more satisfactory dispersibility, it is preferable that a resin is included as the dispersant. Examples of the resin include a urethane-based resin, a styrene-acrylic resin, an acrylic resin, a fluorene-based resin, a polyolefin-based resin, a rosin-modified resin, a terpene-based resin, a polyester-based resin, a polyamide-based resin, an epoxy-based resin, a vinyl chloride-based resin, a vinyl chloride-vinyl acetate copolymer, and an ethylene-vinyl acetate-based resin. Among those, from the viewpoint of having excellent clogging resistance, the resin is preferably a urethane-based resin or a styrene-acrylic resin, and more preferably a styrene-acrylic resin.

The urethane-based resin is not particularly limited as long as it is a resin having a urethane bond in the molecule. Examples of the urethane-based resin include a polyether-type urethane resin including an ether bond in the main chain in addition to a urethane bond, a polyester-type urethane resin including an ester bond in the main chain in addition to a urethane bond, and a polycarbonate-type urethane resin including a carbonate bond in the main chain in addition to a urethane bond. Regarding the urethane-based resin, one kind thereof may be used alone, or two or more kinds thereof may be used in combination.

As the urethane-based resin, a commercially available product can also be used. Examples of the commercially available product include TAKELAC (registered trademark) W6110 (trade name) manufactured by Mitsui Chemicals, Inc.; ACRIT (registered trademark) WBR-022U (trade name) manufactured by Taisei Fine Chemical Co., Ltd.; PERMARIN (registered trademark) UX-368T (trade name), UPRENE (registered trademark) UXA-307 (trade name), and U-COAT (registered trademark) UWS-145 (trade name) manufactured by Sanyo Chemical Industries, Ltd.; and SOL-SPERSE (registered trademark) 47000 (trade name) manufactured by Lubrizol Corporation.

Examples of the styrene-acrylic resin include a styrene-acrylic acid copolymer, a styrene-methacrylic acid copolymer, a styrene-methacrylic acid-acrylic acid ester copolymer, a styrene-α-methylstyrene-acrylic acid copolymer, and a styrene-α-methylstyrene-acrylic acid-acrylic acid ester copolymer. Those copolymers may in the form of any of a random copolymer, a block copolymer, an alternating copolymer, and a graft copolymer.

As the styrene-acrylic resin, a commercially available product can also be used. Examples of the commercially available product include JONCRYL (registered trademark) 67 (trade name) manufactured by BASF Japan, Ltd.; and SOLSPERSE (registered trademark) 43000 (trade name) manufactured by Lubrizol Corporation.

From the viewpoint of more effectively and reliably achieving the operating effects of the present embodiment, the content of the dispersant is preferably 3.0% by mass or more and 8.0% by mass or less with respect to the total amount of the ink composition.

2.4. Surfactant

The ink composition may include a surfactant.

Examples of the surfactant include an acetylene glycol-based surfactant, a fluorine-based surfactant, and a silicone-based surfactant. Regarding the surfactant, one kind thereof may be used alone, or two or more kinds thereof may be used in combination.

Examples of the acetylene glycol-based surfactant include 2,4,7,9-tetramethyl-5-decyne-4,7-diol and an alkylene oxide adduct thereof, and 2,4-dimethyl-5-decyn-4-ol and an alkylene oxide adduct thereof.

As the acetylene glycol-based surfactant, a commercially available product can also be used. Examples of the commercially available product include OLFINE (registered trademark) 104 series (trade name) and E series (trade name) manufactured by Nissin Chemical Industry Co., Ltd.; and SURFYNOL (registered trademark) series (trade name) manufactured by Air Products and Chemicals, Inc.

Examples of the fluorine-based surfactant include a perfluoroalkyl sulfonic acid salt, a perfluoroalkyl carboxylic acid salt, a perfluoroalkyl phosphoric acid ester, a perfluoroalkyl ethylene oxide adduct, a perfluoroalkyl betaine, and a perfluoroalkylamine oxide compound.

As the fluorine-based surfactant, a commercially available product can also be used. Examples of the commercially available product include S-144 (trade name) and S-145 (trade name) manufactured by Asahi Glass Co., Ltd.

Examples of the silicone-based surfactant include a polysiloxane-based compound and a polyether-modified organosiloxane.

As the silicone-based surfactant, a commercially available product can also be used. Examples of the commercially available product include 306, 307, 333, 341, 345, 346, 347, 348, and 349 (all trade names) of BYK (registered trademark) series manufactured by BYK Chemie Japan K. K.

From the viewpoint of more effectively and reliably achieving the operating effects of the present embodiment, the content of the surfactant is preferably 0.5% by mass or more and 5.0% by mass or less with respect to the total amount of the ink composition.

2.5. Water-Soluble Organic Solvent

The ink composition may include a water-soluble organic solvent.

Examples of the water-soluble organic solvent include glycerin; glycols such as ethylene glycol, diethylene glycol, triethylene glycol, propylene glycol, dipropylene glycol, 1,3-propanediol, 1,2-butanediol, 1,2-pentanediol, 1,2-hexanediol, 1,4-butanediol, 1,5-pentanediol, and 1,6-hexanediol; glycol monoethers such as ethylene glycol monomethyl ether, ethylene glycol monoethyl ether, diethylene glycol monomethyl ether, diethylene glycol monoethyl ether, propylene glycol monomethyl ether, propylene glycol monoethyl ether, dipropylene glycol monomethyl ether, dipropylene glycol monoethyl ether, and methyl triglycol; nitrogen-containing solvents such as 2-pyrrolidone, N-methyl-2-pyrrolidone, and N-ethyl-2-pyrrolidone; and alcohols such as methanol, ethanol, n-propyl alcohol, isopropyl alcohol, n-butanol, 2-butanol, tert-butanol, isobutanol, n-pentanol, 2-pentanol, 3-pentanol, and tert-pentanol.

Regarding the water-soluble organic solvent, one kind thereof may be used alone, or two or more kinds thereof may be used in combination.

Glycerin, glycols, and glycol monoethers can predominantly function as penetrating solvents and/or moisturizers. Glycol monoethers tend to have strong properties as penetrating solvents, and glycerin and glycols tend to have strong properties as moisturizers.

From the viewpoint of more effectively and reliably achieving the operating effects of the present embodiment, the content of the water-soluble organic solvent is preferably 5% by mass or more and 30% by mass or less with respect to the total amount of the ink composition.

2.6. Other Components

The ink composition may include various additives such as a dissolution aid, a viscosity modifier, a pH adjusting agent, an antioxidant, an antiseptic agent, an antifungal agent, a corrosion inhibitor, and a chelating agent for capturing metal ions that affect dispersion.

Regarding the additives, one kind thereof may be used alone, or two or more kinds thereof may be used in combination.

Examples of the antiseptic agent include sodium pentachlorophenol, sodium 2-pyridinethiol-1-oxide, and 1,2-dibenzinethiazolin-3-one.

As the antiseptic agent, a commercially available product can also be used. Examples of the commercially available product include CRL, BND, GXL, XL-2, and TN (all trade names) of PROXEL (registered trademark) series manufactured by Lonza Japan, Ltd. Regarding the antiseptic agent, one kind thereof may be used alone, or two or more kinds thereof may be used in combination.

The content of each additive is 0.01% by mass or more and 5.0% by mass or less with respect to the total amount of the ink composition.

2.7. Method for Producing Ink Composition

The ink composition can be prepared by mixing a disperse dye, water, and other components as necessary in any order, and performing filtration or the like as necessary to remove impurities, foreign substances, and the like. As a method of mixing each of the components, a method of sequentially introducing each component into a container equipped with a stirring device such as a mechanical stirrer or a magnetic stirrer, and performing stirring and mixing, is used. Examples of a filtration method include centrifugal filtration and filter filtration.

Furthermore, in order to more satisfactorily disperse the disperse dye in the ink composition, a dye dispersant may be prepared in advance, and the ink composition may be prepared by using the dye dispersant instead of the disperse dye. The dye dispersant can be obtained by, for example, mixing a disperse dye, water, and a dispersant in any order and dispersing the mixture by using a paint shaker or the like.

3. Composition Set

A composition set includes the above-described treatment liquid composition and the above-described ink composition.

In the present embodiment, the treatment liquid composition is attached to a fabric in advance to obtain a fabric having the treatment liquid composition attached thereto. Then, by subjecting the fabric having the treatment liquid composition attached thereto to textile printing using the ink composition, a printed textile having excellent color development properties and dry cleaning resistance while having laundering fastness and texture characteristics in a well-balanced manner can be obtained.

4. Fabric

Examples of the fabric according to the present embodiment include natural textiles such as cotton, linen, wool, leather, and silk; synthetic textiles such as polypropylene, polyester, acetate, triacetate, polyamide, acrylic, and polyurethane; and biodegradable textiles such as polylactic acid. Furthermore, the fabric may also be a blended textile of those.

From the viewpoint of obtaining a printed textile having more excellent color development properties and dry cleaning resistance while having laundering fastness and texture characteristics in a more well-balanced manner, it is preferable that the fabric includes a fiber having a hydroxyl group, and the fabric is more preferably cotton. The fiber having a hydroxyl group may also be a blended textile of those.

Examples of the form of the fabric include a woven fabric, a knitted fabric, a nonwoven fabric, cloth, garments, and other clothing ornaments. Examples of the garments and other clothing ornaments include sewn T-shirts, handkerchiefs, scarves, towels, handbags, and fabric furniture such as bags, curtains, sheets, bedspreads, and wallpaper; cloth before and after cutting as sections to be sewn. Examples of those forms include a long roll-shaped product, a product cut into a predetermined size, and a product having the shape of a manufactured product. Regarding the fabric, it is sufficient that the treatment liquid composition is attached to the fabric, and a fabric to which the treatment liquid composition has been applied in advance may also be used.

It is preferable that the basis weight of the fabric is, for example, 1.0 oz or more and 10.0 oz or less. When the basis weight of the fabric is within such a range, satisfactory recording can be performed.

Regarding the fabric, a fabric that has been colored in advance with a dye may be used. Since the treatment liquid composition is less likely to generate treatment marks, even a fabric that has been colored in advance can be used. That is, even when the cloth is colored, it is possible to perform textile printing while suppressing the generation of treatment marks, and therefore, the quality and commercial value of the printed textile as a manufactured product can be enhanced as compared with conventional cases.

Examples of the dye with which the fabric is colored in advance include water-soluble dyes such as an acidic dye and a basic dye; disperse dyes used in combination with dispersants; reactive dyes; and solvent dyes. When a cotton fabric is used as the fabric, it is preferable to use a disperse dye and a reactive dye suitable for dyeing cotton, and a disperse dye is more preferable.

5. Textile Printing Method 5.1. Treatment Liquid Composition Attaching Step

The textile printing method of the present embodiment includes a treatment liquid composition attaching step of attaching the treatment liquid composition to a fabric.

By going through the present step, a fabric having the treatment liquid composition attached thereto is obtained. Furthermore, by attaching the ink composition to this fabric, a printed textile having excellent color development properties and dry cleaning resistance while having laundering fastness and texture characteristics in a well-balanced manner is obtained.

The textile printing method can be applied to various fabrics, and satisfactory textile printing can be performed.

Regarding the amount of attachment of the treatment liquid composition to the fabric, for example, it is preferable to attach the treatment liquid composition such that the amount of attachment is 0.02 g/cm 2 or more and 0.5 g/cm 2 or less, and it is more preferable to attach the treatment liquid composition such that the amount of attachment is 0.02 g/cm 2 or more and 0.3 g/cm 2 or less. By setting the amount of attachment of the treatment liquid composition in the above-described range, the treatment liquid composition can be attached more uniformly to the fabric, aggregation unevenness of images in the printed textile can be further suppressed, and color development can be enhanced.

Examples of a method of attaching the treatment liquid composition to a fabric include an immersion coating method of immersing a fabric in the treatment liquid composition; a roller coating method of applying the treatment liquid composition with a mangle roller, a roll coater, or the like; a spray coating method of ejecting the treatment liquid composition by using a spray apparatus or the like; and an ink jet coating method of ejecting the treatment liquid composition by an ink jet method. Regarding those coating methods, one method may be used alone to attach the treatment liquid composition to the fabric, or two or more methods may be combined to attach the treatment liquid composition to the fabric.

In the present embodiment, from the viewpoint that the degree of freedom in designing the amount of attachment of the treatment liquid composition is increased, problems at the time of attachment are less likely to occur, and the treatment liquid composition can be uniformly attached to the fabric, it is preferable to attach the treatment liquid composition to the fabric by using rollers such as a mangle roller and a roll coater.

5.2. Drying Step

In textile printing method, it is preferable that the method includes a drying step of drying the treatment liquid composition attached to the fabric, after the treatment liquid composition attaching step of attaching the treatment liquid composition to the fabric. Drying of the treatment liquid composition may be carried out by natural drying; however, from the viewpoint that the amount of attachment of the treatment liquid composition to the fabric is increased, and the drying speed is also increased, it is preferable to perform drying together with heating.

By volatilizing volatile components such as the organic solvent and water included in the treatment liquid composition in the drying step, a printed textile having more excellent color development properties and dry cleaning resistance while having laundering fastness and texture characteristics in a more well-balanced manner tends to be obtained. The reason why such an excellent effect is obtained is not clearly understood; however, the inventors of the present disclosure presume the reason as follows.

That is, when the fabric having the treatment liquid composition attached thereto is dried in advance, and volatile components are removed from the fabric to some extent, the organic solvent, water, and the like become more compatible with the fabric, and the organic solvent can stay more uniformly in the vicinity of the fabric. Here, the sublimation coloring material used in the present embodiment has a property of being highly oil-soluble. Therefore, it is speculated that in the vicinity of the fabric, the dye acquires higher fixability to the fabric while being suitably dissolved in the organic solvent, and the dye can achieve more excellent color development. However, the reason is not limited to this.

From the viewpoint of obtaining a printed textile having even more excellent color development properties and dry cleaning resistance while having laundering fastness and texture characteristics in an even more well-balanced manner, it is preferable that the drying temperature is set to, for example, 300° C. or lower, and more preferably set to 250° C. or lower. Furthermore, by setting the upper limit of the drying temperature in this range, there is a tendency that even when the fabric is colored in advance with a dye, sublimation of the dye brought by heating and drying can be suppressed, and fading of the cloth color of the fabric can be suppressed. The lower limit of the heating temperature is, for example, preferably 50° C. or higher, more preferably 100° C. or higher, and even more preferably 110° C. or higher.

Examples of the heating method include a heat pressing method, a normal pressure steaming method, a high pressure steaming method, and a thermofixing method. Furthermore, examples of the heat source for heating include warm air, infrared radiation (lamp), and microwaves.

It is preferable that the heating time is set to, for example, 1 second or more and 5 minutes or less. When the heating time is in the above-described range, there is a tendency that volatile components such as an organic solvent and water can be more suitably volatilized from the fabric, and damage to the fabric can also be reduced.

The pressure at the time of heating is, for example, preferably set to 1 N/cm³ or more and 10 N/cm³ or less, and more preferably set to 3 N/cm³ or more and 6 N/cm³ or less. When the pressure at the time of drying is in the above-described range, there is a tendency that volatile components such as the organic solvent and water can be more suitably volatilized from the fabric, and damage to the fabric can also be reduced.

5.1.1. Drying Rate

From the viewpoint of obtaining a printed textile having even more excellent color development properties and dry cleaning resistance while having laundering fastness and texture characteristics in an even more well-balanced manner, the drying rate represented by the following Formula (1) in the fabric having the treatment liquid composition attached thereto after the drying step is preferably 50% or more and 90% or less.

$$\text{Drying rate } (\%) = \left[1 - \left[(W_B - W_0)/W_A\right]\right] \times 100 \qquad (1)$$

In Formula (1), $W_B$ represents the mass of the fabric to which the volatile components included in the treatment liquid composition after drying are attached; $W_0$ represents the mass of the untreated fabric; and $W_A$ represents the mass of the fabric to which the volatile components included in the treatment liquid composition before drying are attached.

In the present specification, the drying rate refers to the extent to which the volatile components included in the treatment liquid composition are attached to the fabric, and then the volatile components are volatilized from the fabric by drying, and the drying rate is calculated by the above-described Formula (1). That is, the drying rate refers to the rate of decrease in the mass of the volatile components volatilized from the fabric by drying, from the fabric to which the volatile components are attached. Specifically, for example, when the drying rate is 90%, it means a state in which 90% of the volatile components have been volatilized from the fabric by drying (a state in which 10% of the volatile components remain on the fabric), and when the drying rate is 20%, it means a state in which 20% of the volatile components have been volatilized from the fabric by drying (a state in which 80% of the volatile components remain on the fabric).

The drying rate can be determined by attaching the treatment liquid composition to the fabric, actually measuring the change in mass with respect to the time after attaching to create a calibration curve, and using the mass of the fabric having the treatment liquid composition attached thereto after drying, as a reference. For example, when the mass of the fabric having the treatment liquid composition attached thereto after the drying time $T_2$ is designated as $W_{T2}$, the mass of the fabric having the treatment liquid composition attached thereto after the drying time $T_1$ is designated as $W_{T1}$, and the mass of the fabric having the treatment liquid composition attached thereto after the drying time t is designated as $W_t$, the drying rate in the drying time t can be calculated as $\{(W_t - W_{T2})(W_{T1} - W_{T2})\} \times 100$.

The drying rate can be appropriately set by controlling the drying temperature, the drying time, and the pressure at the time of drying. With regard to the drying temperature, the drying time, and the pressure at the time of drying, reference may be made to the drying temperature, the drying time, and the pressure at the time of drying in the above-described drying step, respectively.

In the drying step, since the drying rate is 50% or more and 90% or less, the organic solvent, water, and the like become more compatible with the fabric, and the organic solvent tends to stay more uniformly in the vicinity of the fabric. Therefore, in the vicinity of the fabric, the dye acquires higher fixability to the fabric while being suitably dissolved in the organic solvent, and a printed textile having more excellent color development properties tends to be obtained.

5.3. Ink Composition Attaching Step

It is preferable that the textile printing method includes an ink composition attaching step of attaching the ink composition to the fabric having the treatment liquid composition attached thereto after the treatment liquid composition attaching step or the drying step. The ink composition to be attached to the fabric is not particularly limited as long as the ink composition includes a disperse dye, and for example, the ink jet ink composition according to the present embodiment can be used. Furthermore, for the ink composition attaching step, the textile printing method using an ink jet method that will be described later can be referred to.

5.4. Washing Step

In the textile printing method, after the treatment liquid composition is attached to the fabric, a washing step may be included as necessary. As the textile printing method includes the present step, the components included in the treatment liquid composition that is not attached to the fabric can be removed.

6. Ink Jet Textile Printing Method

The ink jet textile printing method is a method of attaching an ink composition to the fabric having the treatment liquid composition attached thereto, by using an ink jet method. By adopting the ink jet method, a dyed portion having a fine pattern can also be formed easily and reliably. Furthermore, the ink jet textile printing method can be applied to various fabrics, and satisfactory textile printing can be carried out. By using the ink jet textile printing method, satisfactory textile printing with a small difference in the front and back colors can be carried out even on a thick fabric. Examples of the ink jet textile printing method include an indirect textile printing recording method and a direct textile printing recording method.

6.1. Ink Jet Recording Apparatus

An ink jet recording apparatus used for the textile printing method has at least an ink storage body storing an ink composition and a recording head coupled to this ink storage body, and the ink jet recording apparatus is not particularly limited as long as it can discharge the ink composition from the recording head and form an image on a fabric having the treatment liquid composition attached thereto, or a transfer paper which is an intermediate transfer medium. As the ink jet recording apparatus, either a serial type or a line type can be used. A recording head is mounted on an ink jet recording apparatus of those types, and droplets of an ink composition are discharged intermittently and at predetermined volumes at predetermined timings, through nozzle holes of the recording head while changing the relative positional relationship between the fabric or the transfer paper and the recording head. As a result, the ink composition can be attached to the fabric or the transfer paper, and a predetermined transfer image can be formed.

Generally, in a serial type ink jet recording apparatus, the direction of transport of the recording medium and the direction of reciprocating motion of the recording head intersect each other, and the relative positional relationship between the recording medium and the recording head is changed by a combination of the reciprocating motion of the recording head and the transporting motion of the recording medium. Furthermore, in this case, generally, a plurality of nozzle holes are disposed in the recording head, and a row of nozzle holes, that is, a nozzle array is formed along the direction of transport of the recording medium. In the recording head, a plurality of nozzle arrays may be formed according to the type and number of ink compositions.

Furthermore, generally, in a line type ink jet recording apparatus, the recording head does not perform reciprocating motion, and the relative positional relationship between the recording medium and the recording head is changed by transporting the recording medium, whereby the relative positional relationship between the recording medium and the recording head is changed. Even in this case, generally, a plurality of nozzle holes are disposed in the recording head, and a nozzle array is formed along a direction intersecting the direction of transport of the recording medium.

6.2. Indirect Textile Printing Recording Method

The ink jet textile printing method of the present embodiment includes: a treatment liquid composition attaching step of attaching a treatment liquid composition to a fabric; after the treatment liquid composition attaching step, a drying step of drying the treatment liquid composition attached to the fabric; a discharging step of discharging an ink composition from a recording head to attach the ink composition to an intermediate transfer medium; and a transfer step of transferring the ink composition attached to the intermediate transfer medium, to a fabric having the treatment liquid composition attached thereto, which has been obtained by the treatment liquid composition attaching step. Specifically, in this textile printing method, an ink composition including a disperse dye such as a sublimation dye is discharged by a liquid ejecting head, which is a recording head, to be attached to an intermediate transfer medium, the surface of the intermediate transfer medium, to which the ink composition is attached, and the fabric surface to which the treatment liquid composition is attached are heated in a state in which the surfaces face each other, and the disperse dye included in the ink composition is transferred to the fabric having the treatment liquid composition attached thereto. In the present embodiment, such a textile printing method is also referred to as an indirect textile printing recording method. According to this textile printing method, textile printing can be performed satisfactorily without any limitation on the form of the fabric.

6.2.1. Treatment Liquid Composition Attaching Step

With regard to the treatment liquid composition attaching step, reference can be made to the above-described textile printing method.

6.2.2. Drying Step

With regard to the drying step, reference can be made to the above-described textile printing method.

6.2.3. Discharging Step

In the discharging step, the heated ink composition is discharged from the liquid ejecting head and then attached to the intermediate transfer medium. Specifically, a pressure generating means is driven to discharge the ink composition filled in the pressure generating chamber of the liquid ejecting head through the nozzles.

As the intermediate transfer medium, for example, paper such as plain paper, and a recording medium provided with an ink-receiving layer can be used. The recording medium provided with the ink-receiving layer is referred to as, for example, ink jet paper or coated paper. Among those, paper provided with an ink-receiving layer containing inorganic particles such as silica is more preferable. As a result, in a process of drying the ink composition applied to the intermediate transfer medium, an intermediate recorded material in which bleeding on the recording surface and the like are suppressed can be obtained. Furthermore, when such a medium is used, a disperse dye can be more easily retained at the surface of the recording surface, and sublimation of the disperse dye can be carried out more efficiently in the subsequent transfer step.

In the present step, a plurality of kinds of ink compositions may be used. As a result, for example, the color gamut that can be expressed can be made wider. Among the plurality of kinds of ink compositions, one kind thereof may be the ink composition of the present embodiment, and two or more kinds thereof may be the ink composition of the present embodiment.

6.2.4. Transfer Step

The transfer step is a step of heating the surface of the intermediate transfer medium, to which the ink composition is attached, and the fabric surface to which the treatment liquid composition is attached, in a state in which the surfaces face each other, and transferring the disperse dye included in the ink composition to the fabric having the treatment liquid composition attached thereto. As a result, the disperse dye is transferred, and a printed textile, which is a fabric to which the ink composition is attached, is obtained.

In the present step, the intermediate transfer medium to which the ink composition has been applied may be heated in a state in which the intermediate transfer medium is arranged to face the fabric having the treatment liquid composition attached thereto. In the present step, it is more preferable to heat the intermediate transfer medium and the fabric having the treatment liquid composition attached thereto in a state of being brought into close contact with each other. As a result, for example, a clearer image can be recorded on the fabric having the treatment liquid composition attached thereto, that is, dyeing can be achieved.

Examples of the heating method include steaming with steam, heat pressing with dry heat, a thermosol, an HT steamer with superheated steam, and an HP steamer with pressurized steam. The fabric to which the ink composition has been applied may be immediately subjected to a heating treatment or may be subjected to a heating treatment after a lapse of a predetermined time. From the viewpoint of obtaining a printed textile having more excellent color development properties and dry cleaning resistance while having laundering fastness and texture characteristics in a more well-balanced manner, dry heat is preferable as the heating method.

The heating temperature is preferably 160° C. or higher and 220° C. or lower, and more preferably 190° C. or higher and 210° C. or lower. When the heating temperature is within the above-described range, the energy required for transfer can be further reduced, and the productivity of the printed textile tends to be superior. Furthermore, the color development properties of the printed textile tend to be more excellent.

The heating time may vary depending on the heating temperature; however, the heating time is preferably 30 seconds or more and 120 seconds or less, and more preferably 40 seconds or more and 90 seconds or less. When the heating time is within the above-described range, the energy required for transfer can be further reduced, and the productivity of the printed textile tends to be superior. Furthermore, the color development properties of the printed textile tend to be more excellent.

The amount of attachment of the ink composition attached to the fabric by transfer is preferably, for example, 1.5 mg/cm 2 or more and 6.0 mg/cm 2 or less per unit area of the fabric. When the amount of attachment of the ink composition is in the above-described range, the color development properties of an image or the like formed by textile printing are improved, and at the same time, dryability of the ink attached to the fabric is ensured, so that the occurrence of bleeding in the image or the like is reduced.

6.2.4. Other Steps

In the present method, an intermediate treatment step and a post-treatment step may be included as necessary.

Examples of the intermediate treatment step include a step of preliminarily heating the fabric having the treatment liquid composition attached thereto before the drying step.

Examples of the post-treatment step include a step of washing the printed textile.

6.3. Direct Textile Printing Recording Method

The ink jet textile printing method may include a treatment liquid composition attaching step of attaching a treatment liquid composition to a fabric; and an ink composition attaching step of discharging an ink composition from a recording head to attach the ink composition to the fabric having the treatment liquid composition attached thereto, which is obtained by the treatment liquid composition attaching step. In the present embodiment, such a textile printing method is also referred to as a direct textile printing recording method. When this textile printing method is used, a dyed portion having a fine pattern can also be formed easily and reliably. Furthermore, since it is not necessary to use a plate such as an intermediate transfer medium, the on-demand properties are excellent, and it is possible to suitably cope with small-quantity production and multi-item production.

6.2.1. Step of Obtaining Fabric Having Treatment Liquid Composition Attached Thereto With regard to the treatment liquid composition attaching step, reference can be made to the above-described textile printing method.

6.2.2. Ink Composition Attaching Step

In the ink composition attaching step, the ink composition is attached to the fabric having the treatment liquid composition attached thereto. Furthermore, the ink composition attaching step may include a step of further attaching an ink composition on the region to which an ink composition is attached.

In the ink composition attaching step, the maximum amount of attachment to the fabric is preferably 50 mg/cm 2 or more and 200 mg/cm 2 or less, and more preferably 80 mg/cm 2 or more and 150 mg/cm 2 or less. When the maximum amount of attachment is in the above-described range, more satisfactory color development properties are obtained. Furthermore, the friction fastness of the image is also excellent, and the aggregation unevenness tends to be inconspicuous.

In the present step, it is preferable to have a drying step of drying the treatment liquid composition attached to the fabric after the treatment liquid composition attaching step. By including this step, a printed textile having more excellent color development properties and dry cleaning resistance while having laundering fastness and texture characteristics in a more well-balanced manner tends to be obtained. With regard to the drying step, reference may be made to the above-described textile printing method as well.

In the present step, it is preferable to perform heating when the ink composition is attached to the fabric having the treatment liquid composition attached thereto. As a result, for example, a clearer image can be recorded on the fabric having the treatment liquid composition attached thereto, that is, dyeing can be achieved.

Regarding the heating method, reference can be made to the method described in the drying step of the above-described textile printing method.

With regard to heating, the surface temperature of the heated fabric is preferably 60° C. or higher and 180° C. or lower. When the surface temperature is within the above-described range, damage to the ink jet head and the fabric can be reduced, and the ink can easily wet and spread uniformly on the fabric and easily permeate the fabric. The surface temperature can be measured by using, for example, a non-contact thermometer (trade name "IT2-80", manufactured by Keyence Corporation).

The heating time is preferably set to, for example, 5 seconds or more and 5 minutes or less. When the heating time is in the above-described range, the fabric can be sufficiently heated while reducing damage to the ink jet head and the fabric.

6.2.3. Other Steps

In the present method, an intermediate treatment step and a post-treatment step may be included as necessary. For those steps, reference can be made to the other steps in the above-described indirect textile printing recording method.

EXAMPLES

Hereinafter, the present disclosure will be described more specifically by using Examples and Comparative Examples. The present disclosure is not intended to be limited by the following Examples.

1. Preparation of Treatment Liquid Composition for Dye Printing

Examples 1 to 16 and Comparative Examples 1 to 5

Treatment Liquids 1 to 21

Each component was put into a mixture tank so as to obtain the compositions described in Tables 1 and 2, and the mixture was mixed, stirred, and filtered through a 5-μm membrane filter to obtain each of treatment liquids 1 to 21 as a treatment liquid composition.

The numerical value of the blending amount of each component in Tables 1 and 2 represents % by mass. The blending amounts of the resin particles and the crosslinking agent represent blending amounts (% by mass) calculated in terms of solid content. The "SP value" and "b.p." for the organic solvent represent the SP value obtained by Hansen and the standard boiling point (° C.) at 1 atm, respectively. As the pure water, ion-exchanged water was used and added such that the mass of each treatment liquid composition became 100% by mass.

Furthermore, each component shown in Tables 1 and 2 is as follows.

Resin Particles

KT-8803 . . . ELITEL (registered trademark) KT-8803 (trade name, Unitika, Ltd., solid content: 30% by mass, glass transition temperature Tg: 65° C.)

Crosslinking Agent

220 . . . FIXER #220 (trade name, Murayama Chemical Laboratory Co., Ltd., isocyanate group-containing compound having an isocyanurate skeleton in the structure, solid content: 40% by mass)

WS-500 . . . EPOCROS (registered trademark) WS-500 (trade name, Nippon Shokubai Co., Ltd., oxazoline group-containing compound, solid content: 39% by mass)

24

Organic Solvent

Triethylene glycol (SP value: 13.5, standard boiling point: 287° C.)

2-Pyrrolidone (SP value: 11.5, standard boiling point: 245° C.)

Dipropylene glycol monomethyl ether (SP value: 10.1, standard boiling point: 188° C.)

Dipropylene glycol dimethyl ether (SP value: 8.4, standard boiling point: 171° C.) Triethylene glycol monobutyl ether (SP value: 10.0, standard boiling point: 278° C.)

1,2-Hexanediol (SP value: 12.1, standard boiling point: 170° C.)

Glycerin (SP value: 16.7, standard boiling point: 290° C.)

Ethanol (SP value: 13.0, standard boiling point: 78° C.)

TABLE 1

| | | | SP value | b.p. (° C.) | Example 1 Treatment liquid 1 | Example 2 Treatment liquid 2 | Example 3 Treatment liquid 3 | Example 4 Treatment liquid 4 | Example 5 Treatment liquid 5 | Example 6 Treatment liquid 6 | Example 7 Treatment liquid 7 |
|---|---|---|---|---|---|---|---|---|---|---|---|
| Treatment liquid composition (% by mass) | Resin particles | KT-8803 | — | — | 2 | 2 | 2 | 2 | 2 | 2 | 2 |
| | Cross-linking agent | #220 | — | — | 1 | 1 | 1 | 1 | 1 | 1 | 1 |
| | | WS-500 | — | — | | | | | | | |
| | Organic solvent | Triethylene glycol | 13.5 | 287 | 5 | 20 | 50 | | | | |
| | | 2-Pyrrolidone | 11.5 | 245 | | | | 5 | 50 | | |
| | | Dipropylene glycol monomethyl ether | 10.1 | 188 | | | | | | 5 | 50 |
| | | Dipropylene glycol dimethyl ether | 8.4 | 171 | | | | | | | |
| | | Triethylene glycol monobutyl ether | 10.0 | 278 | | | | | | | |
| | | 1,2-Hexanediol | 12.1 | 170 | | | | | | | |
| | | Glycerin | 16.7 | 290 | | | | | | | |
| | | Ethanol | 13.0 | 78 | | | | | | | |
| | | Pure water | — | — | Balance | Balance | Balance | Balance | Balance | Balance | Balance |
| | Total | | | | 100 | 100 | 100 | 100 | 100 | 100 | 100 |

| | | | SP value | b.p. (° C.) | Example 8 Treatment liquid 8 | Example 9 Treatment liquid 9 | Example 10 Treatment liquid 10 | Example 11 Treatment liquid 11 | Example 12 Treatment liquid 12 |
|---|---|---|---|---|---|---|---|---|---|
| Treatment liquid composition (% by mass) | Resin particles | KT-8803 | — | — | 2 | 2 | 2 | 2 | 2 |
| | Cross-linking agent | #220 | — | — | 1 | 1 | 1 | 1 | 1 |
| | | WS-500 | — | — | | | | | |
| | Organic solvent | Triethylene glycol | 13.5 | 287 | | | | | |
| | | 2-Pyrrolidone | 11.5 | 245 | | | | | |
| | | Dipropylene glycol monomethyl ether | 10.1 | 188 | | | | | |
| | | Dipropylene glycol dimethyl ether | 8.4 | 171 | 5 | 50 | | | |
| | | Triethylene glycol monobutyl ether | 10.0 | 278 | | | 5 | 50 | |
| | | 1,2-Hexanediol | 12.1 | 170 | | | | | 5 |
| | | Glycerin | 16.7 | 290 | | | | | |
| | | Ethanol | 13.0 | 78 | | | | | |
| | | Pure water | — | — | Balance | Balance | Balance | Balance | Balance |
| | Total | | | | 100 | 100 | 100 | 100 | 100 |

| | | | SP value | b.p. (° C.) | Example 13 Treatment liquid 13 | Example 14 Treatment liquid 14 | Example 15 Treatment liquid 15 | Example 16 Treatment liquid 16 |
|---|---|---|---|---|---|---|---|---|
| Treatment liquid composition (% by mass) | Resin particles | KT-8803 | — | — | 2 | 0.5 | 20 | 2 |
| | Cross-linking agent | #220 | — | — | 1 | 1 | 1 | |
| | | WS-500 | — | — | | | | 1 |

TABLE 1-continued

| | | SP value | b.p. | | | | |
|---|---|---|---|---|---|---|---|
| Organic solvent | Triethylene glycol | 13.5 | 287 | | 20 | 20 | 20 |
| | 2-Pyrrolidone | 11.5 | 245 | | | | |
| | Dipropylene glycol monomethyl ether | 10.1 | 188 | | | | |
| | Dipropylene glycol dimethyl ether | 8.4 | 171 | | | | |
| | Triethylene glycol monobutyl ether | 10.0 | 278 | | | | |
| | 1,2-Hexanediol | 12.1 | 170 | 50 | | | |
| | Glycerin | 16.7 | 290 | | | | |
| | Ethanol | 13.0 | 78 | | | | |
| | Pure water | — | — | Balance | Balance | Balance | Balance |
| | Total | | | 100 | 100 | 100 | 100 |

TABLE 2

| | | | SP value | b.p. (° C.) | Comparative Example 1 Treatment liquid 17 | Comparative Example 2 Treatment liquid 18 | Comparative Example 3 Treatment liquid 19 | Comparative Example 4 Treatment liquid 20 | Comparative Example 5 Treatment liquid 21 |
|---|---|---|---|---|---|---|---|---|---|
| Treatment liquid composition (% by mass) | Resin particles | KT-8803 | — | — | | 2 | 2 | 2 | 2 |
| | Cross-linking agent | #220 | — | — | | 1 | 1 | 1 | 1 |
| | | WS-500 | — | — | | | | | |
| | Organic solvent | Triethylene glycol | 13.5 | 287 | 20 | | 2 | | |
| | | 2-Pyrrolidone | 11.5 | 245 | | | | | |
| | | Dipropylene glycol monomethyl ether | 10.1 | 188 | | | | | |
| | | Dipropylene glycol dimethyl ether | 8.4 | 171 | | | | | |
| | | Triethylene glycol monobutyl ether | 10.0 | 278 | | | | | |
| | | 1,2-Hexanediol | 12.1 | 170 | | | | | |
| | | Glycerin | 16.7 | 290 | | | | 20 | |
| | | Ethanol | 13.0 | 78 | | | | | 20 |
| | | Pure water | — | — | Balance | Balance | Balance | Balance | Balance |
| | Total | | | | 100 | 100 | 100 | 100 | 100 |

2. Preparation of Ink Jet Ink Composition C Ink

Each component was put into a mixture tank so as to obtain the compositions described in Table 3, and the mixture was mixed and stirred with a stirrer for 2 hours. Thereafter, the mixture was filtered through a membrane filter having a pore size of 1 μm to obtain C ink as an ink composition. The numerical value of each component in Table 3 represents % by mass.

Furthermore, each component shown in Table 3 is as follows.

Disperse Dye

Disperse Blue 359: C. I. Disperse Blue 359 (commercially available product)

Water-Soluble Organic Solvent

Propylene glycol

Glycerin

Methyl triglycol

Surfactant

BYK(R)-348: BYK (registered trademark)-348 (trade name, silicone-based surfactant, manufactured by BYK Chemie Japan K. K.)

TABLE 3

| | | | C ink |
|---|---|---|---|
| Ink jet ink composition (% by mass) | Disperse dye | Disperse Blue 359 | 5 |
| | Water-soluble | Propylene glycol | 5 |

TABLE 3-continued

| | | C ink |
|---|---|---|
| organic solvent | Glycerin | 10 |
| | Methyl triglycol | 5 |
| Surfactant | BYK (R)-348 | 0.5 |
| | Pure water | Balance |
| Total | | 100 |

3. Fabrication of Printed Textile

3.1. Fabrication of Fabric Having Treatment Liquid Composition Attached Thereto Examples 1 to 18, Comparative Examples 1 to 5, and Reference Examples 1 and 2

Each of the treatment liquids 1 to 21 was used as the treatment liquid composition, and the treatment liquid composition was attached to the fabric. Specifically, a fabric having the treatment liquid composition attached thereto was obtained as follows.

The treatment liquid composition was soaked into a white cotton broadcloth #4000 (trade name, manufactured by Toyobo Co., Ltd.) as the fabric, and the treatment liquid composition was applied on the fabric with a mangle roller such that the drawing rate was 80%. Thereafter, the fabric was dried by using a heat press machine TP-608M (trade name, manufactured by Taiyo Seiki Co., Ltd.) for 3 seconds to 40 seconds under the conditions of a temperature of 200° C. and a pressure of 4.2 N/cm$^3$, and each of the fabrics having the treatment liquid composition attached thereto and having the drying rates shown in Tables 4 and 5 was obtained.

Here, the drying rate of the fabric having the treatment liquid composition attached thereto after the drying step was calculated as follows. First, the treatment liquid 2 was used as the treatment liquid composition, and under the same conditions as described above, the treatment liquid composition was soaked into a white cotton broadcloth #4000 (trade name, manufactured by Toyobo Co., Ltd.) so that the treatment liquid composition was applied on the fabric with a mangle roller so as to obtain a drawing rate of 80%. Thereafter, the fabric was dried by using a heat press machine TP-608M (trade name, manufactured by Taiyo Seiki Co., Ltd.) under the conditions of a temperature of 200° C. and a pressure of 4.2 N/cm$^3$ for 3 seconds. When the mass $W_B$ of the fabric after drying, to which the volatile components included in the treatment liquid 2 were attached, the mass $W_0$ of the untreated fabric, and the mass $W_A$ of the fabric before drying, to which the volatile components included in the treatment liquid 2 were attached, were measured, and the drying rate was calculated by the above-described Formula (1), the drying rate was 50%. The volatile components included in the treatment liquid 2 were triethylene glycol and water.

Similarly, when the drying rate was calculated by the above-described Formula (1) by using a fabric to which the volatile components included in the treatment liquid composition were attached and which was obtained by setting the drying time to 40 seconds, the drying rate was 90%. In Examples 1 to 16 and Comparative Examples 1 to 5, since drying was performed for any time between 3 seconds and 40 seconds, the drying rate was 50% or more and 90% or less.

Next, a calibration curve was created by using a drying rate of 50% after a drying time of 3 seconds and a drying rate of 90% after a drying time of 40 seconds. In Examples 17 and 18 and Reference Examples 1 and 2, the drying rate was calculated from the drying time by using this calibration curve.

Furthermore, the drawing rate (S) was calculated by the following Formula (2).

$$S(\%)=[(A-B)/B]\times100 \qquad (2)$$

In Formula (2), S represents the drawing rate (%); A represents the mass of the fabric having the treatment liquid composition attached thereto; and B represents the mass of the fabric before attaching the treatment liquid composition.

3.2. Fabrication of Intermediate Recording Medium to which Ink Composition is Attached Examples 1 to 18, Comparative Examples 1 to 5, and Reference Examples 1 and 2

C ink was charged into a cartridge of an ink jet printer PX-G930 (trade name, manufactured by Seiko Epson Corporation). Thereafter, an image having a fill pattern was formed on a surface of a coated paper (TRANSJET Sportline 1254 (trade name), manufactured by Cham Paper Group Schweiz A G) as an intermediate transfer medium, the surface being provided with a coat layer, by attaching the ink at a resolution of 720 dpi×720 dpi under the conditions in which the ink ejection amount in the case of an ink discharge amount of 100% Duty was 12 mg/inch$^2$. As a result, an intermediate recording medium to which the ink composition was attached was obtained.

3.3. Textile Printing

Examples 1 to 18, Comparative Examples 1 to 5, and Reference Examples 1 and 2

The surface on which the image of the intermediate recording medium to which the ink composition obtained as described above was attached was formed, was heat-transferred to each of the fabrics (cotton broadclothes) to which the treatment liquid compositions obtained as described above were attached, by using a heat press machine TP-608M (trade name, manufactured by Taiyo Seiki Co., Ltd.), under the conditions of a temperature of 200° C. and a pressure of 4.2 N/cm$^3$ for 60 seconds, and each of printed textiles as fabrics to which C ink was attached was obtained.

4. Evaluation of Textile Printed Material 4.1. Dry Cleaning Resistance

For each of the printed textiles according to Examples 1 to 18, Comparative Examples 1 to 5, and Reference Examples 1 and 2 obtained by the above-described textile printing, dry cleaning fastness was evaluated according to the following evaluation criteria in accordance with the ISO105-D10 standards specified as "Test methods for color fastness to dry cleaning" in JIS L0860. Those results are shown in Tables 4 and 5. When the rating is C or higher, it can be said that satisfactory effects are obtained.

Evaluation Criteria

A: The dry cleaning fastness is higher than grade 4.
B: The dry cleaning fastness is grade 3-4 (intermediate grade) or higher and grade 4 or lower.
C: The dry cleaning fastness is grade 2-3 (intermediate grade) or higher and grade 3 or lower.
D: The dry cleaning fastness is grade 1-2 (intermediate grade) or higher and grade 2 or lower.
E: The dry cleaning fastness is grade 1 or lower.

4.2. Color Development Properties

Each of the printed textiles of Examples 1 to 18, Comparative Examples 1 to 5, and Reference Examples 1 and 2 obtained by the above-described textile printing was left to stand at room temperature of 25° C. for 3 days. Thereafter, the color development density (OD value) for the C ink was measured by using a fluorescence spectral densitometer FD-7 (trade name, manufactured by Konica Minolta, Inc.), in each of the printed textiles after being left to stand under the following measurement conditions and at room temperature of 25° C.

Measurement Conditions

Observation light source: D65
Observation field of view: 2°
Status: T
Polarizing filter: Not installed Thereafter, the color development properties for the C ink were evaluated according to the following evaluation criteria, by comparing the OD values for the printed textiles of Examples 1 to 18, Comparative Examples 1 to 5, and Reference Examples 1 and 2 with the OD values for the printed textile of Comparative Example 2. Those results are shown in Tables 4 and 5. When the rating is C or higher, it can be said that satisfactory effects are obtained.

Evaluation Criteria

A: The OD value was 150% or more as compared with the OD value for the printed textile of Comparative Example 2.

B: The OD value was 125% or more and less than 150% as compared with the OD value for the printed textile of Comparative Example 2.

C: The OD value was 100% or more and less than 125% as compared with the OD value for the printed textile of Comparative Example 2.

D: The OD value was 50% or more and less than 100% as compared with the OD value for the printed textile of Comparative Example 2.

E: The OD value was less than 50% as compared with the OD value for the printed textile of Comparative Example 2.

4.3. Laundering Fastness

For each of the printed textiles of Examples 1 to 18, Comparative Examples 1 to 5, and Reference Examples 1 and 2 obtained by the above-described textile printing, a laundering fastness test was carried out in accordance with the A-2 method of JIS L0844 (Test methods for color fastness to laundering). Specifically, each of the printed textiles of Examples 1 to 18, Comparative Examples 1 to 5, and Reference Examples 1 and 2 obtained by the above-described textile printing was laundered with a household washing machine (ZABOON (trade name), manufactured by Toshiba Corporation) by using a general household laundry detergent (fluorescent brightening agent-free), rinsed, dehydrated, and dried, and then discoloration and fading of the printed textiles were determined. With regard to the discoloration and fading, the degree of fading was evaluated according to the following evaluation criteria, according to the discoloration and fading gray scale of JIS L0804: 2004 (ISO 105-C10 (B2)). Those results are shown in Tables 4 and 5. When the rating is C or higher, it can be said that satisfactory effects are obtained.

Evaluation Criteria

A: The laundering fastness is grade 5 or higher.

B: The laundering fastness is grade 4 or higher and lower than grade 5.

C: The laundering fastness is grade 3 or higher and lower than grade 4.

D: The laundering fastness is grade 2 or higher and lower than grade 3.

E: The laundering fastness is lower than grade 2.

4.4. Texture Characteristics

The texture characteristics of each of the printed textiles of Examples 1 to 18, Comparative Examples 1 to 5, and Reference Examples 1 and 2 obtained by the above-described textile printing were evaluated by a sensory test. Specifically, for the obtained printed textiles, judges conducted sensory evaluation of the touch feeling of the printed textiles according to the following criteria and evaluated the texture characteristics. Those results are shown in Tables 4 and 5. It should be noted that even those rated as E were able to withstand actual use.

Evaluation Criteria

A: The printed textile is soft and has a feeling comparable to the original tactile texture of the fabric.

B: The printed textile is soft; however, a slightly stiff touch feeling is recognized.

C: The printed textile is slightly hard, and a slightly stiff feeling is recognized.

D: The printed textile is hard, and a slightly stiff feeling is recognized.

E: The printed textile is hard, and a markedly stiff feeling is recognized.

TABLE 4

|  |  | Example 1 | Example 2 | Example 3 | Example 4 | Example 5 | Example 6 | Example 7 | Example 8 | Example 9 |
|---|---|---|---|---|---|---|---|---|---|---|
|  | Treatment liquid composition | Treatment liquid 1 | Treatment liquid 2 | Treatment liquid 3 | Treatment liquid 4 | Treatment liquid 5 | Treatment liquid 6 | Treatment liquid 7 | Treatment liquid 8 | Treatment liquid 9 |
|  | Drying rate (%) | 50-90 | 50-90 | 50-90 | 50-90 | 50-90 | 50-90 | 50-90 | 50-90 | 50-90 |
|  | Ink composition | C ink | C ink | C ink | C ink | C ink | C ink | C ink | C ink | C ink |
| Evaluation results | Dry cleaning resistance | B | A | A | B | A | C | A | C | A |
|  | Color development properties | B | A | A | B | A | B | A | B | A |
|  | Laundering fastness | A | B | C | A | C | A | C | A | C |
|  | Texture characteristics | B | B | B | B | B | B | B | B | B |

|  |  | Example 10 | Example 11 | Example 12 | Example 13 | Example 14 | Example 15 | Example 16 |
|---|---|---|---|---|---|---|---|---|
|  | Treatment liquid composition | Treatment liquid 10 | Treatment liquid 11 | Treatment liquid 12 | Treatment liquid 13 | Treatment liquid 14 | Treatment liquid 15 | Treatment liquid 16 |
|  | Drying rate (%) | 50-90 | 50-90 | 50-90 | 50-90 | 50-90 | 50-90 | 50-90 |
|  | Ink composition | C ink | C ink | C ink | C ink | C ink | C ink | C ink |
| Evaluation results | Dry cleaning resistance | B | A | C | B | C | A | B |
|  | Color development properties | B | A | B | A | A | A | B |
|  | Laundering fastness | A | C | A | C | C | A | B |
|  | Texture characteristics | B | B | B | B | A | C | B |

TABLE 5

| | | Comparative Example 1 | Comparative Example 2 | Comparative Example 3 | Comparative Example 4 | Comparative Example 5 | Reference Example 1 | Example 17 | Example 18 | Reference Example 2 |
|---|---|---|---|---|---|---|---|---|---|---|
| | Treatment liquid composition | Treatment liquid 17 | Treatment liquid 18 | Treatment liquid 19 | Treatment liquid 20 | Treatment liquid 21 | Treatment liquid 2 | Treatment liquid 2 | Treatment liquid 2 | Treatment liquid 2 |
| | Drying rate (%) | 50-90 | 50-90 | 50-90 | 50-90 | 50-90 | 25 | 50 | 90 | 95 |
| | Ink composition | C ink | C ink | C ink | C ink | C ink | C ink | C ink | C ink | C ink |
| Evaluation results | Dry cleaning resistance | D | E | D | D | E | C | A | A | D |
| | Color development properties | A | C | B | C | C | E | A | B | C |
| | Laundering fastness | E | A | A | B | B | E | B | B | A |
| | Texture characteristics | A | B | B | B | B | B | B | B | B |

As shown in Tables 4 and 5, it was found that when the treatment liquid composition of the present embodiment is attached to a fabric, and the fabric having the treatment liquid composition attached thereto is subjected to textile printing, a printed textile having excellent color development properties and dry cleaning resistance is obtained.

From a comparison with Examples 2, 14, and 15, it was found that when the content of the resin particles is 1% by mass or more and 20% by mass or less in terms of solid content with respect to the total amount of the treatment liquid composition, a printed textile having more excellent color development properties and dry cleaning resistance while having laundering fastness and texture characteristics in a more well-balanced manner is obtained.

From a comparison between Example 2 and Example 16, it was found that when an isocyanate group-containing compound having an isocyanurate skeleton in the structure is used as a crosslinking agent, a textile printed material having more excellent color development properties and dry cleaning resistance while having laundering fastness and texture characteristics in a more well-balanced manner is obtained.

From a comparison between Example 2 and Examples 1 and 3, it was found that when the content of the organic solvent is 10% by mass or more and 40% by mass or less with respect to the total amount of the treatment liquid composition, a textile printed material having more excellent color development properties and dry cleaning resistance while having laundering fastness and texture characteristics in a more well-balanced manner is obtained.

From a comparison between Examples 17 and 18 and Reference Examples 1 and 2, it was found that when the drying rate of the fabric having the treatment liquid composition attached thereto after a drying step is 50% or more and 90% or less, a printed textile having even more excellent color development properties and dry cleaning resistance while having laundering fastness and texture characteristics in an even more well-balanced manner is obtained.

What is claimed is:

1. A treatment liquid composition for dye printing used in a state of being attached to a fabric, the treatment liquid composition comprising:
  resin particles;
  a crosslinking agent;
  an organic solvent; and
  water,
  wherein the resin particles include a polyester-based resin, and the polyester-based resin includes a carboxy group,
  the organic solvent has an SP value of 13.5 or less,
  the organic solvent has a standard boiling point of 100° C. or higher, and
  the content of the organic solvent is 15% by mass or more and 30% by mass or less with respect to a total amount of the treatment liquid composition.

2. The treatment liquid composition for dye printing according to claim 1, wherein
  the content of the organic solvent is 50% by mass or less with respect to the total amount of the treatment liquid composition.

3. The treatment liquid composition for dye printing according to claim 1, wherein
  the organic solvent is at least one selected from the group consisting of a glycol, a glycol ether, and a nitrogen-containing solvent.

4. The treatment liquid composition for dye printing according to claim 1, wherein
  the organic solvent includes one or more selected from the group consisting of triethylene glycol, dipropylene glycol monomethyl ether, dipropylene glycol dimethyl ether, diethylene glycol monobutyl ether, and 2-pyrrolidone.

5. The treatment liquid composition for dye printing according to claim 1, wherein
  the crosslinking agent includes an isocyanate group-containing compound.

6. The treatment liquid composition for dye printing according to claim 5, wherein
  the isocyanate group-containing compound has an isocyanurate skeleton in a structure.

7. The treatment liquid composition for dye printing according to claim 1, wherein
  a content of the resin particles is 1% by mass or more and 20% by mass or less in terms of solid content with respect to the total amount of the treatment liquid composition.

8. The treatment liquid composition for dye printing according to claim 1, wherein
  a content of the crosslinking agent is 0.1% by mass or more and 5% by mass or less in terms of solid content with respect to the total amount of the treatment liquid composition.

9. The treatment liquid composition for dye printing according to claim 1, wherein
  the fabric includes a fiber having a hydroxyl group.

10. The treatment liquid composition for dye printing according to claim 1, wherein
  the treatment liquid composition is used for being attached to the fabric before the fabric is subjected to dye printing.

11. A composition set comprising:

the treatment liquid composition for dye printing according to claim 1; and an ink jet ink composition, wherein the ink jet ink composition includes a disperse dye and water.

12. A textile printing method comprising:

a treatment liquid composition attaching step of attaching the treatment liquid composition for dye printing according to claim 1 to a fabric.

13. An ink jet textile printing method comprising:

a treatment liquid composition attaching step of attaching a treatment liquid composition for dye printing included in the composition set according to claim 11 to a fabric;

a drying step of drying the treatment liquid composition attached to the fabric, after the treatment liquid composition attaching step;

a discharge step of discharging the ink jet ink composition included in the composition set according to claim 11 from a recording head to attach the ink jet ink composition to an intermediate transfer medium; and a transfer step of transferring the ink jet ink composition attached to the intermediate transfer medium to the fabric having the treatment liquid composition for dye printing attached thereto after the drying step.

14. The textile printing method according to claim 13, wherein a drying rate represented by following Formula (1) in the fabric having the treatment liquid composition for dye printing attached thereto after the drying step is 50% or more and 90% or less:

$$\text{Drying rate } (\%) = \left[1 - \left[(WB - W0)/WA\right]\right] \times 100 \qquad (1)$$

in Formula (1),

WB represents a mass of the fabric after the drying, to which volatile components included in the treatment liquid composition for dye printing are attached, W0 represents a mass of the fabric being untreated, and WA represents a mass of the fabric before the drying, to which the volatile components included in the treatment liquid composition for dye printing are attached.

*   *   *   *   *